US006799024B2

(12) United States Patent
Wang et al.

(10) Patent No.: US 6,799,024 B2
(45) Date of Patent: Sep. 28, 2004

(54) METHOD AND APPARATUS FOR AUTOMATIC GAIN CONTROL COMPENSATION IN A WIRELESS COMMUNICATION SYSTEM

(75) Inventors: Michael M. Wang, Hawthorn Woods, IL (US); Tyler Brown, Mundelein, IL (US)

(73) Assignee: Motorola Inc., Schaumburg, IL (US)

(*) Notice: Subject to any disclaimer, the term of this patent is extended or adjusted under 35 U.S.C. 154(b) by 451 days.

(21) Appl. No.: 10/025,075

(22) Filed: Dec. 18, 2001

(65) Prior Publication Data

US 2003/0114126 A1 Jun. 19, 2003

(51) Int. Cl.[7] .............................................. H04B 1/06
(52) U.S. Cl. ................................ 455/234.1; 455/250.1; 455/254; 455/70; 375/345; 375/346; 375/349
(58) Field of Search ..................... 455/234.1, 234.2, 455/239.1, 250.1, 254, 70, 517, 550.1; 375/345, 140, 144, 346, 349

(56) References Cited

U.S. PATENT DOCUMENTS

| 5,949,817 A | * | 9/1999 | Marshall ..................... 375/142 |
| 5,950,131 A | * | 9/1999 | Vilmur ......................... 455/434 |
| 6,078,796 A | * | 6/2000 | Ling ........................... 455/234.1 |
| 6,282,184 B1 | * | 8/2001 | Lehman et al. ............... 370/342 |
| 6,324,387 B1 | * | 11/2001 | Kamgar et al. ............ 455/234.1 |
| 6,373,878 B1 | * | 4/2002 | Palenius et al. ............. 375/136 |
| 6,577,880 B1 | * | 6/2003 | Ishida et al. ............... 455/562.1 |
| 6,654,405 B1 | * | 11/2003 | McDonough ................ 375/130 |

* cited by examiner

Primary Examiner—Edward F. Urban
Assistant Examiner—Duy K Le
(74) Attorney, Agent, or Firm—Marshall, Gerstein & Borun LLP (57) ABSTRACT

In a code division multiple access wireless communication system having at least one base transceiver station and at least one mobile station having a mobile station receiver assembly configured to receive a coded signal having an information-bearing signal portion and an associated interfering signal portion from the base transceiver station, a method and apparatus for automatic gain control compensation in the mobile station receiver assembly, is disclosed. The method includes causing a gain adjustment to the coded signal by an AGC circuit in the mobile station receiver assembly to produce a post-AGC signal having a post-AGC interfering signal portion with an associated post-AGC interfering signal power level, and an associated gain error value. The method further includes compensating for the gain adjustment to the coded signal if the number of receiver fingers assigned to demodulate the coded signal is less than or equal to a predetermined number.

19 Claims, 6 Drawing Sheets

METHOD AND APPARATUS FOR AUTOMATIC GAIN CONTROL COMPENSATION IN A WIRELESS COMMUNICATION SYSTEM

FIELD OF THE INVENTION

The present invention relates to wireless communication systems, and more particularly, to a method and an apparatus for automatic gain control compensation in a wireless communication system.

BACKGROUND OF THE INVENTION

Wireless communication systems that utilize digitally coded communication signals are known in the art. One such system is a direct sequence Code Division Multiple Access (DS-CDMA) cellular communication system, such as set forth in the Telecommunications Industry Association Interim Standard 2000 (TIA IS-2000) herein after referred to as IS-2000. In accordance with IS-2000, the coded communication signals used in the DS-CDMA system include signals that are transmitted in a common channel, typically a 1.25 MHz bandwidth common channel, between mobile stations (MS) and base transceiver stations (BTS), or base stations, located at the base sites (BS) of a wireless communication system. A BTS transmitting to a mobile station is often referred to as a serving BTS.

Another such system is a Universal Mobile Telecommunications System (UMTS) cellular communication system, such as set forth in IMT-2000. Like the IS-2000 system, UMTS is a DS-CDMA based technology that transmits signals in a common channel between mobile stations and BTS's.

A digital wireless communication system is a complex network of elements and their interconnections and protocols. Typically elements include (1) a radio link to the mobile stations (e.g., cellular telephones), which is provided by one or more base transceiver stations, (2) communication links between the base stations, (3) a controller, typically one or more base station controllers or centralized base station controllers (BSC/CBSC), to control communication between and to manage the operation and interaction of the base stations, (4) a call controller or switch, typically a call agent (i.e., a "softswitch"), for routing calls within the system, and (5) a link to the land line or public switch telephone network (PSTN), which is usually also provided by the call agent.

During a typical wireless communication, the mobile station communication signal is supported by the BTS associated with the coverage area in which the mobile station is traveling. Each BTS coverage area may include one or more cells depending on the configuration of the wireless communication system. Thus, the radio link supporting the mobile station communication signal may remain with one particular BTS even though the mobile station travels from cell to cell, or the radio link supporting the mobile communication signal may be handed-over to, or reestablished with, another BTS. In addition, the cell in which the mobile station is located at any point in time may be referred to as the same-cell while all other cells may be referred to as other-cells.

A coded communication signal transmitted by a serving BTS typically arrives at a mobile station having an information bearing signal portion and an interfering signal portion. The information bearing signal portion contains the originally transmitted information. The interfering signal portion may or may not contain the originally transmitted information. The interfering signal portion may include two interference components, same-cell interference and other-cell interference. Same-cell interference is created by multipath reflections of transmissions from those BTS(s)/cells serving the mobile station and may vary considerably in power over a short time. Other-cell interference is generated by other BTS(s)/cells and has a relatively constant signal power.

Although other-cell interference has a relatively constant signal power, the power of the coded signal received at the mobile station from the BTS may vary dramatically depending on the proximity of the mobile station to the base station and the transmitter power of the BTS. In addition, power of the coded signal received at the mobile station from the BTS may vary as a result of multipath fading due to reflections and/or scattering of the signal off of nearby scatters such as buildings. Accordingly, a mobile station receiver having, among other things, an analog-to-digital converter (ADC), a demodulator, and a decoder, must be designed to receive signals that vary over a wide range of signal power.

In general, the mobile station receiver utilizes an automatic gain control (AGC) circuit to cause an adjustment to the amplification of the coded signal received at a mobile station antenna in an attempt to compensate for the wide range of signal power. In particular, the coded signal received by the mobile station antenna is adjusted by the AGC to some predetermined power level suitable for input into the ADC. In other words, the AGC receives the coded signal, performs an adjustment to the coded signal, and then outputs a post-AGC signal at a constant power level suitable for input to the ADC thereby allowing for an ADC with a fewer number of quantized levels than would be required without an AGC circuit. As a consequence of using an ADC with fewer quantized levels, the post-AGC circuit design is simplified because fewer bits are needed to represent signals in the demodulator, decoder, etc. The post-AGC signal includes, among other things, an interfering signal portion at an associated power level and an information-bearing signal portion at an associated power level.

Although operation of the AGC generally enables simplification of the overall post-AGC circuitry of the mobile station receiver, addition of the AGC to the mobile station receiver may require that a more complicated receiver demodulator design be used when a particular type of channel coding is utilized. For example, when convolutional coding is used such as the type used for coding a DS-CDMA information-bearing signal, the mobile station receiver demodulator is required to supply information to the mobile station receiver channel decoder. The information is calculated by the demodulator using the post-AGC signal and is equal to a ratio of the information-bearing signal power to the interfering signal power (SIR) of the sequence of received symbols of the information-bearing signal.

The ease with which the demodulator can calculate and supply the SIR information required by the decoder depends on whether the post-AGC interfering signal power level output varies. If the post-AGC interfering signal power level is almost constant, the demodulator can easily supply the required SIR information. If the post-AGC interfering signal power level output from the AGC is not constant, however, the demodulator is required to first estimate an interfering signal power level for each received symbol, and second, the demodulator must divide an estimated information-bearing signal power level for each received symbol by the estimated interfering signal power level for each received symbol to obtain the SIR of the sequence of received symbols of the information-bearing signal required by the decoder. As is known, the step of dividing the estimated information-bearing signal power level by the estimated interfering signal power level is computationally prohibitive.

DETAILED DESCRIPTION OF THE PREFERRED EMBODIMENTS

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus and method to compensate for automatic gain control of the coded signal received at a mobile station in a digital wireless communication when the coded signal received consists of a dominant time-varying information-bearing signal and a constant interfering signal.

In accordance with an embodiment of the invention, an apparatus and method for compensating for automatic gain control of the coded signal received at the mobile station operates in a digital wireless communication system. The digital wireless communication system may include at least one base transceiver station and at least one mobile station having a mobile station receiver assembly configured to receive the coded signal having an information-bearing signal portion and an associated interfering signal portion from the base transceiver station. The mobile station receiver assembly includes an automatic gain control circuit for adjusting a gain of the coded signal, a receiver having a number of fingers for demodulating the coded signal, and a finger manager for assigning the fingers to demodulate the coded signal. A gain adjustment is made to the coded signal by an AGC circuit in the mobile station receiver assembly to produce a post-AGC signal having a post-AGC interfering signal portion with an associated post-AGC interfering signal power level, and an associated gain error value. The gain adjustment to the coded signal is then compensated for, or substantially removed from the post-AGC signal, if the number of receiver fingers assigned to demodulate the coded signal is less than a predetermined number of fingers.

Figure 1:
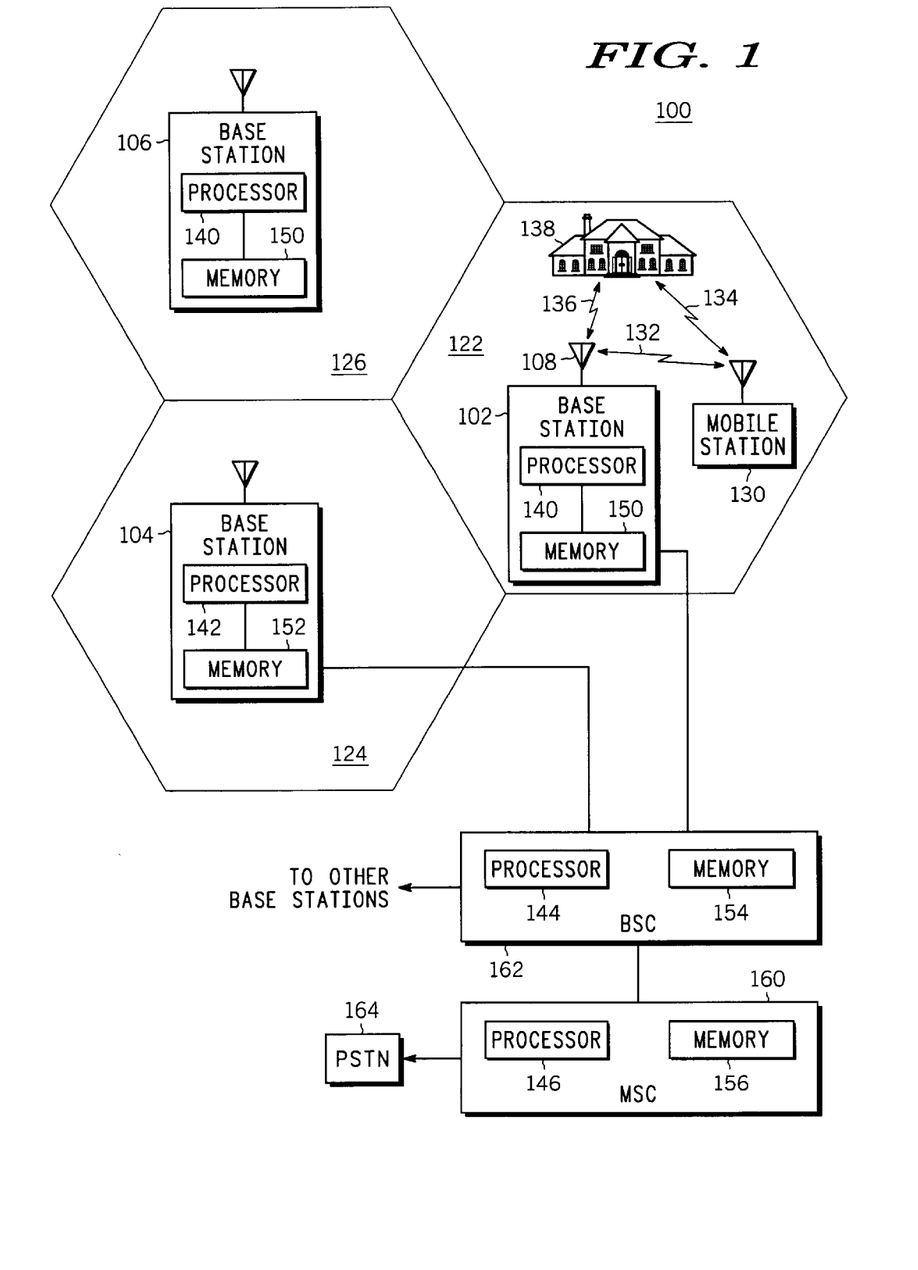
FIG. 1 depicts a DS-CDMA wireless communication system.

Turning now to the drawings, wherein like numerals designate like components, FIG. 1 depicts a CDMA wireless communication system 100. The CDMA wireless communication system 100 preferably comprises a DS-CDMA cellular communication system or a multi-carrier CDMA cellular communication system. Although the CDMA wireless communication system 100 depicted in connection with FIG. 1 includes only one base site having three BTSs, generally a CDMA wireless communication system includes multiple base sites with each base site having one or more BTSs. Thus, BTSs 102, 104, 106 provide service to coverage areas 122, 124, and 126 respectively, within one base site. Further, each of the coverage areas 122, 124, and 126 may be referred to as a cell.

The BTS 102 includes, among other things, a processor 140 and a memory 150. Likewise, the BTS 104 includes a processor 142 and a memory 152. The base stations 102, 104, and 106 are coupled to a base site controller (BSC) 162, which includes, among other things, a processor 144 and a memory 154, and which is in turn coupled to a mobile switching center (MSC) 160, also including a processor 146 and a memory 156. The MSC 160 is coupled to a public switched telephone network (PSTN) 164 using known techniques.

The BTS 102 transmits coded communication signals to, and receives coded communication signals from, the mobile station 130 via an antenna 108. A receiver assembly, preferably a RAKE receiver assembly, within the BTS 102 provides tracking and demodulation capability of incoming multipath coded signals from mobile stations. Similarly, the mobile station 130 includes a transceiver that transmits coded signals to, and receives coded signals from one or more BTSs such as the BTS 102 within a coverage area 122. A communication system using CDMA channelization is described in detail in TIA/EIA-95-B, Mobile Station-Base Station Compatibility Standard for Dual Mode Wideband Spread Spectrum Cellular Systems, Telecommunications Industry Association, Washington, D.C. July 1996 [IS-95B].

A coded analog wireless communication signal arriving at the mobile station 130 may be described as a coded signal R(t) 132, transmitted from the BTS 102 as an information-bearing signal S(t) composed of an information-bearing signal portion, or message, comprised of Walsh symbols, and a spreading code. The inclusion of the spreading code results in a unique pseudo-random noise sequence (PN sequence) identifiable by the RAKE receiver assembly of the mobile station 130.

In addition to the information bearing signal portion, the coded signal R(t) 132 may arrive at the mobile station 130 with an interfering signal portion. The interfering signal portion may include same-cell interference, and /or other-cell interference. For example, the coded signal R(t) 132 received by the mobile station 130 may include interfering signals from within coverage area 122 such as a multipath replicas 134 and 136 reflected off of a nearby building 138. In addition, the coded signal R(t) 132 may also include interfering signals from area 124, outside of coverage area 122.

The coded signal R(t) 132 received at the mobile station 130 is conveyed between the base station 102 and the mobile station 130 through a radio frequency (RF) channel. The RF channel includes a reverse-link (mobile station 130 to base station 102) and a forward-link (base station 102 to mobile station 130). In a DS-CDMA wireless communication system, the channel is often modeled as a set of paths with each path carrying a copy of the transmitted mobile communication signal and having an associated path-dependent gain and a path-dependent time delay. For example, a channel may be modeled as three paths from a serving BTS antenna to a mobile station antenna to include one direct (line-of-sight) path and two reflected paths with the reflected paths due to nearby buildings and or local terrain. The transmitted information-bearing signal S(t) may incur different delays associated with the three paths. Accordingly, the coded signal R(t) received at the mobile station is a sum of the delayed versions of the information-bearing signal portions of the mobile communication signal.

Figure 2:
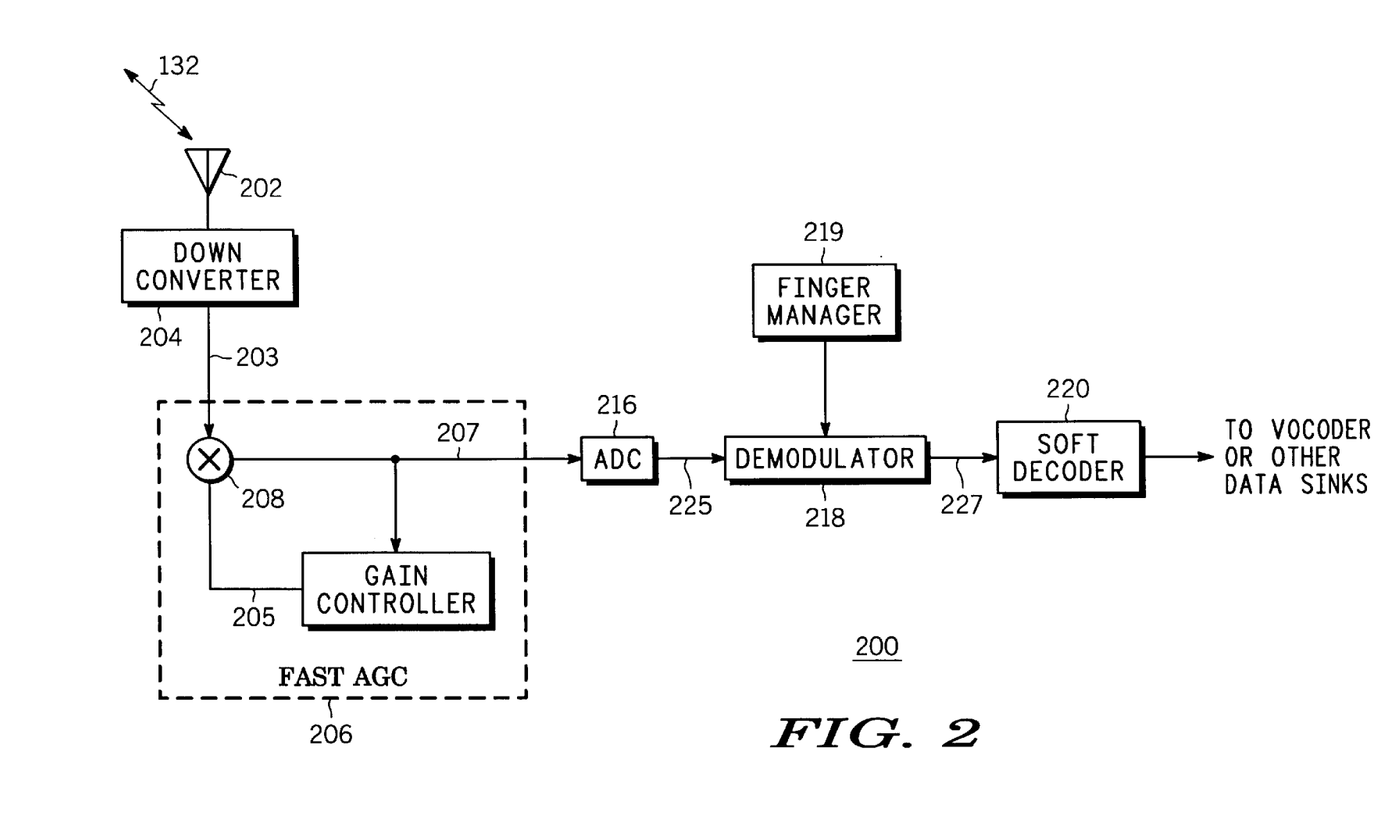
FIG. 2 is a high-level, partial block diagram of a mobile station receiver assembly.

A high-level, partial block diagram of a receiver assembly 200 within a mobile station such as the mobile station 130 is illustrated in FIG. 2. The receiver assembly 200 preferably includes a RAKE receiver having a number of receiver fingers. The RAKE receiver may be coherent, non-coherent or quasi-coherent. The receiver assembly 200 further includes an antenna 202 for receiving a coded signal, a down-converter 204, a fast AGC 206, an ADC 216, a demodulator 218, a finger manager 219 for assigning the RAKE receiver fingers to demodulate, and a soft decoder 220. The fast AGC 206 includes an AGC multiplier 208 and a gain controller 212.

The antenna 202 receives the coded signal R(t) 132, transmitted as an information-bearing signal S(t) from a serving BTS with an information-bearing signal portion M(t) and a spreading code P(t). The information-bearing signal S(t) may be expressed as M(t)×P(t). Path-dependent gain and path-dependent time delayed versions of information-bearing signal S(t) arrive at the mobile station antenna 202 as the coded signal R(t) 132 having the information-bearing signal portion M(t) as well as an additional non-information bearing signal portion(s), herein referred to as an interfering signal portion i(t). The interfering signal portion may include same-cell interference, $i_{sc}(t)$ due to multipath replicas of S(t) and subsequent receiver finger demodulation by multiple receiver fingers within the receiver assembly 200, and /or other-cell interference, $i_{oc}(t)$ due to signal transmissions from other sources. Upon receipt by the antenna 202, frequency down-converting of the coded signal R(t) 132 is performed by well-known methods by the down-converter 204.

The received coded signal R(t) may therefore be expressed as:

$$R(t) = \sum_{l=0}^{L-1} \alpha_l(t) S(t - \tau_l) + i_{oc}(t)$$

where $\alpha_l(t)$ is the complex path gain of the $l^{th}$ path, L is the number of paths in the channel, S(t) is the information-bearing signal portion transmitted by the BTS to the mobile station (assumed to have unit power) with $\tau_l$ being a time delay associated with the $l^{th}$ path, and $i_{oc}(t)$ is the other-cell interference having power $\sigma_{oc}^2$.

A down-converted signal 203, output from the down-converter 204 and received by the fast AGC 206, enters the AGC multiplier 208 where it is multiplied with an AGC gain value g(t) 205 to yield a gain controlled signal R'(t) 207. The gain controlled signal R'(t) 207 may be expressed as:

$$R'(t) = g(t) \left[ \sum_{l=0}^{L-1} \alpha_l(t) S(t - \tau_l) + i_{oc}(t) \right]$$

where g(t) is the AGC gain value. The AGC gain value g(t) 205 represents a gain adjustment made by the gain controller 212 at a time t. The AGC gain value g(t) 205 is selected such that the power of the signal R'(t) input into the ADC remains approximately constant (assumed to be one). The gain controlled signal R'(t) 207 is the product of the coded signal R(t) 132 and the AGC gain value g(t) 205. Thus, the gain controlled signal R'(t) 207 results from an adjustment to the down-converted signal 203 such that the gain controlled signal R'(t) 207 falls within an optimum target variance suitable for input to the ADC 216. The square of the AGC gain value g(t) 205 may be expressed as:

$$g^2(t) = \frac{1}{\sum_{l=1}^{L} |\alpha(t)|^2 + \sigma_{oc}^2}$$

Conversion of the gain controlled signal R'(t) 207 into a digital signal stream 225 is performed by well known methods by the ADC 216. Next a descrambler/despreader of the demodulator 218 removes the spreading code P(t) previously inserted into the series of Walsh symbols by the transmitting BTS. As is known, in the IS-2000 forward-link channel, a received information-bearing frame of the coded signal R(t) 132 includes three hundred and eighty four (384) received Walsh symbols, or Walsh codes, which are each sixty-four bits long. As is also well known, the demodulator 218 generates a series of SIR sequence values 227. The SIR sequence values 227 are a series of integer values that represent a soft estimate of the likelihood of the presence of a "1" or "0" and therefore a corresponding likelihood that a series of the sequence of integer values represent one or more Walsh symbols. The soft decoder 220 which may include a deinterleaver and a convolutional decoder (not shown), then utilizes the SIR sequence values 227 to generate an estimate of information bits, 1 or 0, representative of the information used to code the information signal portion.

As previously discussed, the demodulator 218 is required to supply the SIR information to the soft decoder 220. The SIR information is equal to a ratio of the information-bearing signal power to the interfering signal power of the sequence of received Walsh symbols of the information-bearing signal portion. The ease with which the demodulator 218 can supply the required SIR information to the soft decoder 220 depends on whether the post-AGC interfering signal power level is substantially constant, or varies. If the post-AGC interfering power level is substantially constant, the demodulator 218 can easily supply the required SIR information. If the post-AGC interfering signal power level is not constant, however, the demodulator 218 is required to perform the steps of estimating the interfering signal power level for each received symbol, estimating the information-bearing signal power level of each received symbol, as well as perform the computationally prohibitive step of dividing the estimated information-bearing signal power level by the estimated interfering signal power level.

A constant post-AGC interfering signal power level results when the received coded signal R(t) 132 is dominated by its other-cell interfering signal portion, which is typically constant, thereby causing the AGC 206 to adjust its output based on the power of the interfering signal portion rather than the information-bearing signal portion. Further, because the SIR for received symbols of the information-bearing signal portion would have a relatively constant denominator when the coded signal R(t) 132 is dominated by its interfering signal, the interfering signal power level can be mathematically factored in as a proportionality constant. The demodulator 218 is then required only to estimate the information-bearing signal power level of the received symbols; a calculation easily performed using a pilot signal or pilot symbols inserted into the transmitted symbol stream of the information-bearing signal.

An undesirable variable post-AGC interfering signal power level results when the received coded signal R(t) 132 has a constant interfering signal portion but is dominated by a time-varying information-bearing signal portion, thereby causing the AGC 206 to adjust its output based on the power of the time-varying information-bearing signal portion. This results in a time-varying post AGC interfering signal power level because, as discussed above, the AGC 206 operates to ensure that a constant power level is input to the ADC 216. Due to the varying post-AGC interfering signal power level, the demodulator 218 must then perform the undesirable step of dividing the estimated information-bearing signal power level by the estimated interfering signal.

A DS-CDMA signal such as coded signal 132, transmitted by a serving BTS is typically received by the RAKE receiver assembly of one or more mobile station in the coverage area served by the BTS. A searcher in the RAKE receiver assembly assesses the received the coded signal R(t) 132 to determine the time delay locations associated with the received signals having the strongest information-bearing portions. Upon determining the time delays, or time offsets of the strongest signal(s), a finger manager in the in the RAKE receiver assembly assigns one or more RAKE receiver fingers to despread, delay, and weight the received coded signal R(t) 132 according to its path-dependent gain and a path-dependent time delay.

In the case of a received coded signal R(t) 132 having a dominant time-varying information-bearing signal portion and a constant interfering signal portion, variations in the post AGC interfering signal power level are a function of the number of RAKE receiver fingers assigned to demodulate the various paths of the total received signal. If the dominant time-varying information-bearing signal portion is received at a higher power level than the constant interfering signal portion, the finger manager in the RAKE receiver assembly will likely assign only one RAKE receiver finger to demodulate the total received signal. As a result, the post-AGC interfering signal power level fluctuates in response to gain adjustments made to the coded signal R(t) thereby causing undesirable fluctuations of the post AGC interfering signal power level. This is due to a lack of same-cell interference from adjacent finger demodulation, which would, in the case of multiple assigned RAKE receiver finger, negate the post-AGC interfering signal power level fluctuations. If, however, the finger manager in the RAKE receiver assigns multiple RAKE receiver fingers to demodulate the total received signal, the post-AGC interfering signal power is relatively constant. This is due to the addition of same-cell interference from adjacent finger demodulation, the addition of which substantially negates the post-AGC interfering signal power level fluctuations. This may be shown mathematically as follows.

For example, assuming that the RAKE receiver has l number of fingers where l=1, 2, . . . L, with each of the fingers demodulating and decoding a received signal transmitted via the $l^{th}$ path, the output of a RAKE receiver finger $F_l(t)$, demodulating and decoding a signal of the $l^{th}$ path may be expressed as:

$$F_l(t) = \int_{t+\tau_l}^{t+\tau_l+T} g(\lambda)\alpha_l^*(\lambda)P(\lambda-\tau_l)R'(\lambda)d\lambda$$

where the weight is represented by the expression, $g(t)\alpha_l^*(t)$ with $\alpha_l^*(t)$ representing a complex conjugate of the path gain of the $l^{th}$ path, and l=1, 2, . . . L, and where the despreading process is represented by an integration over a symbol interval $T_s$ of a multiplication of the delayed, spreading code $P(t-\tau_l)$ with the weight.

Substituting the above expression for R'(t) and assuming that both g(t) and α(t) are constant over a symbol interval, for example a 52 microsecond symbol interval, the output of the RAKE receiver finger assigned to demodulate at the $l^{th}$ path, $F_l(t)$, may be expressed as:

$$F_l(t) = g^2(t)|\alpha_l(t)|^2 M(t) + i_{sc}^l + i_{oc}^l(t)$$

where $|\alpha_l|$ is the magnitude path gain with l=1, 2, . . . L, where $g^2(t)|\alpha_l(t)|^2 M(t)$ is a scaled version of the message signal M(t), and where $i_{sc}^l$ is the same-cell signal interference of the received signal of the $l^{th}$ path after having been despread by the RAKE receiver, and $i_{oc}^l$ is the other-cell signal interference of the received signal of the $l^{th}$ path after having been despread by the RAKE receiver.

Thus, $i_{sc}^l(t)$ and $i_{oc}^l(t)$ may be expressed as:

$$i_{sc}^l(t) = g^2(t)\alpha_l^*(t)\sum_{k\neq l}\alpha_k(t)\int_{t+\tau_l}^{t+\tau_l+T_s} P(\lambda-\tau_l)S(\lambda-\tau_k)d\lambda$$

$$i_{oc}^l(t) = g^2(t)\alpha_l^* \int_{t+\tau_l}^{t+\tau_l+T_s} P(\lambda-\tau_l)i_{oc}(\lambda)d\lambda$$

As a result, the total interference power level at the output of a RAKE receiver finger assigned to the $l^{th}$ path, $\sigma_l^2$ is:

$$\sigma_l^2 = g^4(t)|\alpha_l(t)|^2\sum_{k\neq l}|\alpha_k(t)|^2 + g^4(t)\sigma_{oc}^2|\alpha_l(t)|^2$$

Thus, the total interference power at the output of all RAKE fingers (e.g. RAKE finger output 1+2+ . . . L) may be represented as:

$$\sigma_{total}^2 = g^4(t)\sum_{l=1}^{L}|\alpha_l(t)|^2 \sum_{l\neq k}|\alpha_k(t)|^2 + g^4(t)\sigma_{oc}^2\sum_{l=1}^{L}|\alpha_l(t)|^2$$

Substituting the above expression for $g^2(t)$, the total interference power becomes:

$$\sigma_{total}^2(t) = \frac{\sum_{l=1}^{L}|\alpha_l(t)|^2\sum_{l\neq k}|\alpha_k(t)|^2}{\left(\sum_{l=1}^{L}|\alpha_l(t)|^2 + \sigma_{oc}^2\right)^2} + \frac{\sigma_{oc}^2\sum_{l=1}^{L}|\alpha_l(t)|^2}{\left(\sum_{l=1}^{L}|\alpha_l(t)|^2 + \sigma_{oc}^2\right)^2}$$

As previously discussed, if the power of the interfering signal portion of the received coded signal R(t) 132 is dominant, the AGC adjusts its output based on the interfering signal portion and the demodulator is not required to perform a computationally prohibitive estimation. If, however, the power of the information-bearing signal portion is dominant as compared to the other-cell interfering signal portion, $$\text{i.e. } \sigma_{oc}^2 << \sum_{l=1}^{L}|\alpha_l(t)|^2,$$

then the demodulator may or may not be required to perform the computationally prohibitive estimation. Thus, if the information-bearing signal is dominant, $\sigma_{total}^2(t)$ reduces to:

$$\sigma_{total}^2(t) = \frac{\sum_{l=1}^{L} |\alpha_l(t)|^2 \sum_{l \neq k} |\alpha_k(t)|^2}{\left(\sum_{L=1}^{l} |\alpha_l(t)|^2\right)^2} + \frac{\sigma_{oc}^2}{\sum_{l=1}^{L} |\alpha_l(t)|^2}$$

If L=1 as is the case when one RAKE receiver finger has been assigned to demodulate the coded signal R(t) 132, then $$\sigma_{total}^2 = \frac{\sigma_{oc}^2}{|\alpha_l(t)|^2} \quad (1)$$

If $L \geq 1$ as is the case when more than one RAKE receiver finger has been assigned to demodulate coded signal R(t), then $$\sigma_{total}^2(t) = \frac{\sum_{l=1}^{L} |\alpha_l(t)|^2 \sum_{l \neq k} |\alpha_k(t)|^2}{\left(\sum_{l=1}^{L} |\alpha_l(t)|^2\right)^2} \quad (2)$$

because, if the information-bearing signal is dominant, then $$\frac{\sigma_{oc}^2}{\sum_{l=1}^{L} |\alpha_l(t)|^2} << \frac{\sum_{l=1}^{L} |\alpha_l(t)|^2 \sum_{l=k} |\alpha_k(t)|^2}{\left(\sum_{l=1}^{L} |\alpha_l(t)|^2\right)^2}$$

For example, if $$L = 2\sigma_{total}^2(t) = \frac{|\alpha_1^2||\alpha_2^2| + |\alpha_2^2||\alpha_1^2|}{(|\alpha_1^2| + |\alpha_2^2|)^2}, \sigma_{total}^2$$

yields a substantially constant value because the numerator and denominator increase in tandem.

Therefore, as illustrated by the equations (1) and (2) above, for the cases where the information-bearing signal portion is dominant, if L=1, indicating that one dominant path is being demodulated by the RAKE receiver, the post-AGC interfering signal power level varies because the magnitude of the path gain appears only in the denominator and the numerator is constant. If, however, L>1 indicating that multiple dominant paths are being demodulated by the RAKE receiver, the total interference power level variation at the AGC output is limited because the magnitude of the path gain, squared, appears in both the numerator and denominator.

Figure 3:
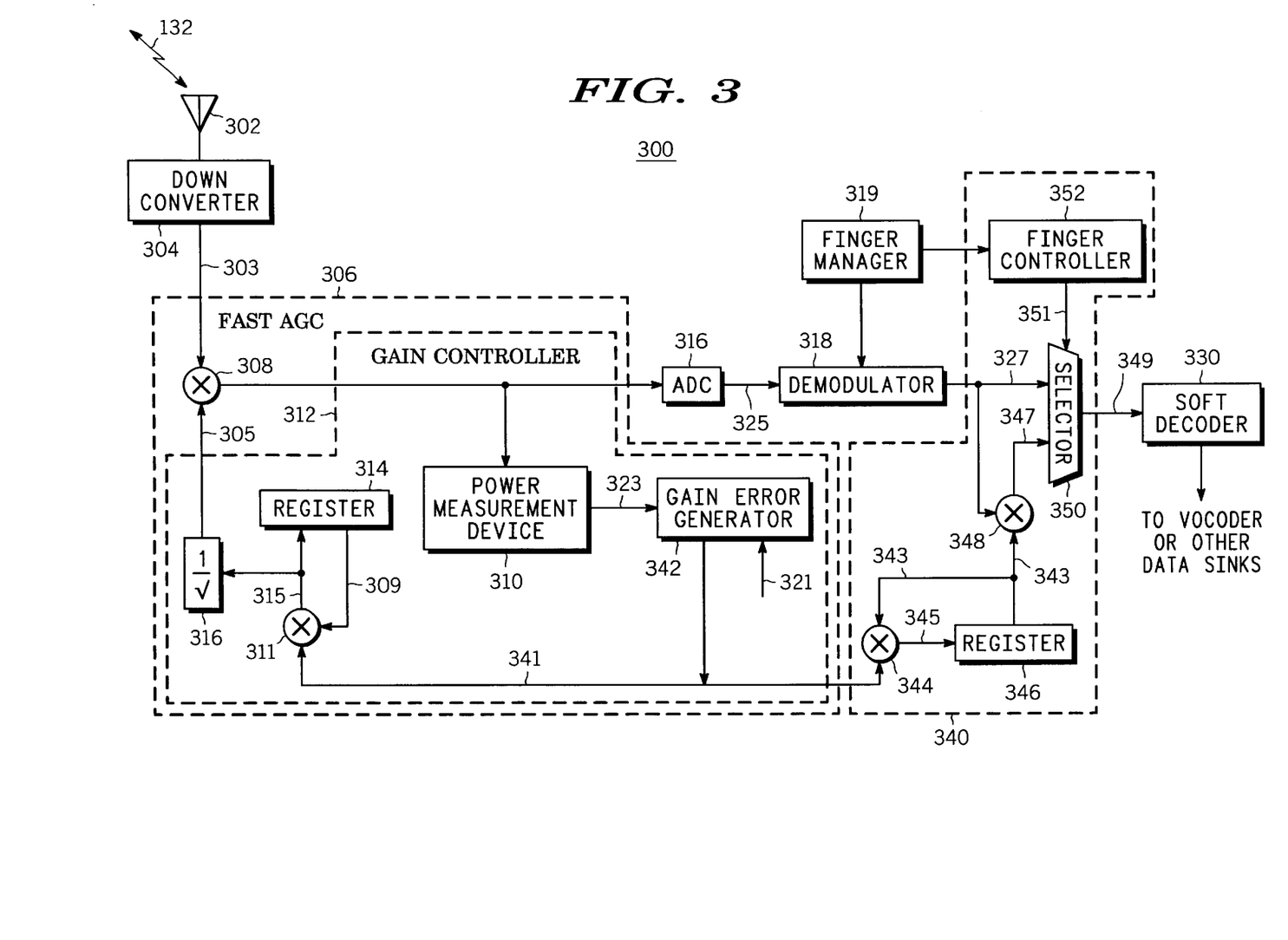
FIG. 3 is detailed block diagram of a mobile station receiver assembly employing an embodiment of an automatic gain control compensator.

A detailed, partial block diagram of a receiver assembly 300 within a mobile station that includes an exemplary automatic gain control compensator 340 capable of employing the teachings of the present invention, is illustrated in FIG. 3. The receiver assembly 300 preferably comprises a RAKE receiver having a number of RAKE receiver fingers. The RAKE receiver may be coherent, non-coherent or quasi-coherent. The receiver assembly 300 includes an antenna 302 for receiving a coded signal, for example, the coded signal R(t) 132 received by the mobile station 130, transmitted as an information-bearing signal S(t) from the BTS 102 shown in connection with FIG. 1. Receiver assembly 300 further includes a down-converter 304, a fast AGC 306, an ADC 316, a demodulator 318, a finger manager 319 for assigning the RAKE receiver fingers to demodulate, and a soft decoder 330. The fast AGC 306 further includes an AGC multiplier 308 and a gain controller 312. The gain controller 312 includes a power measurement device 310, a gain controller multiplier 311, a register 314, an inverse square root generator 316, and a gain error generator 342. The automatic gain control compensator 340 includes a second compensator multiplier 344, a compensator register 346, a first compensator multiplier 348, a selector 350, and a finger controller 352.

Figure 5:
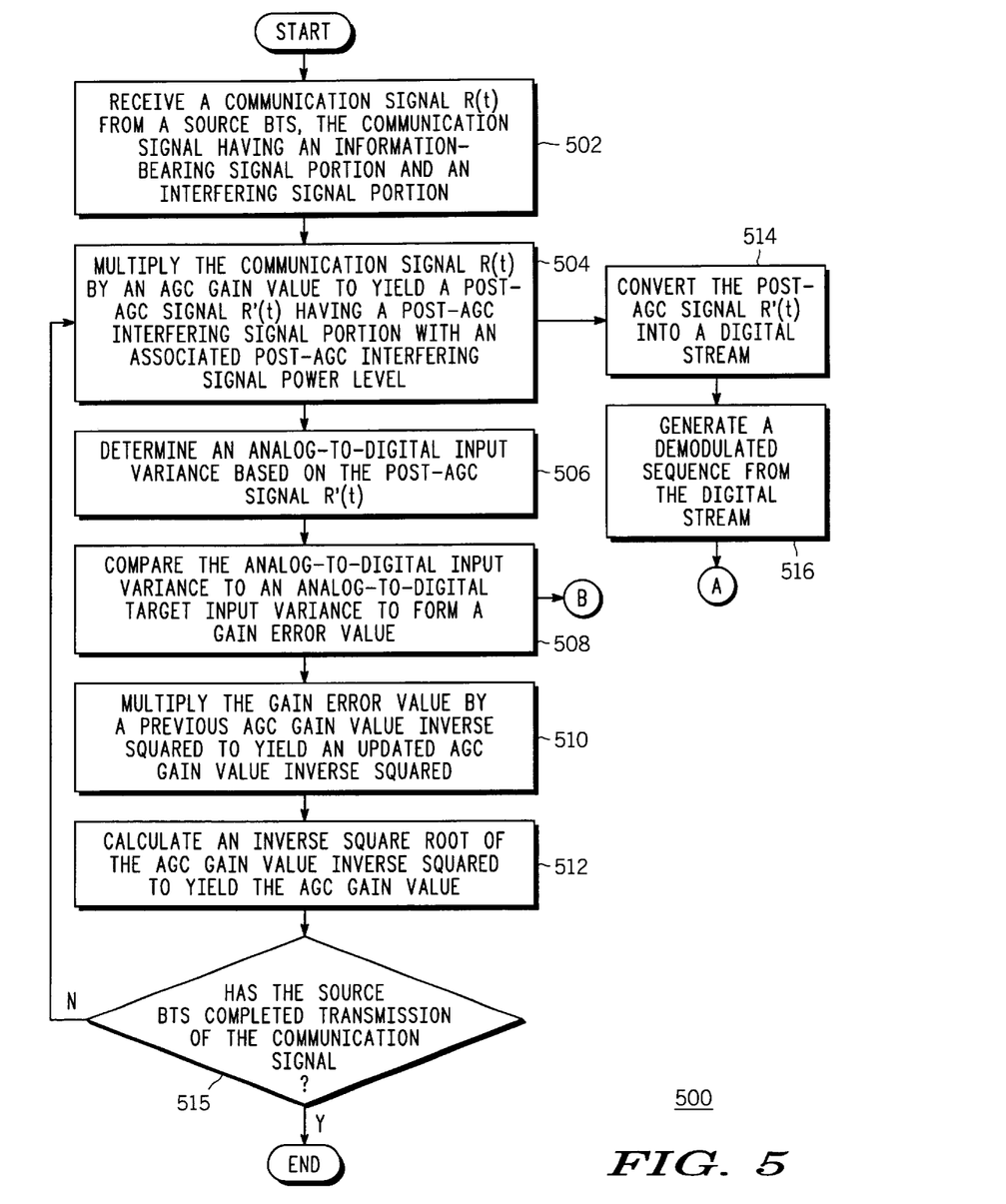
FIGS. 5 and 6, when joined along similarly lettered lines, together form a flow chart of a method for compensating for automatic gain control in a receiver assembly of a wireless communication system.
Figure 6:
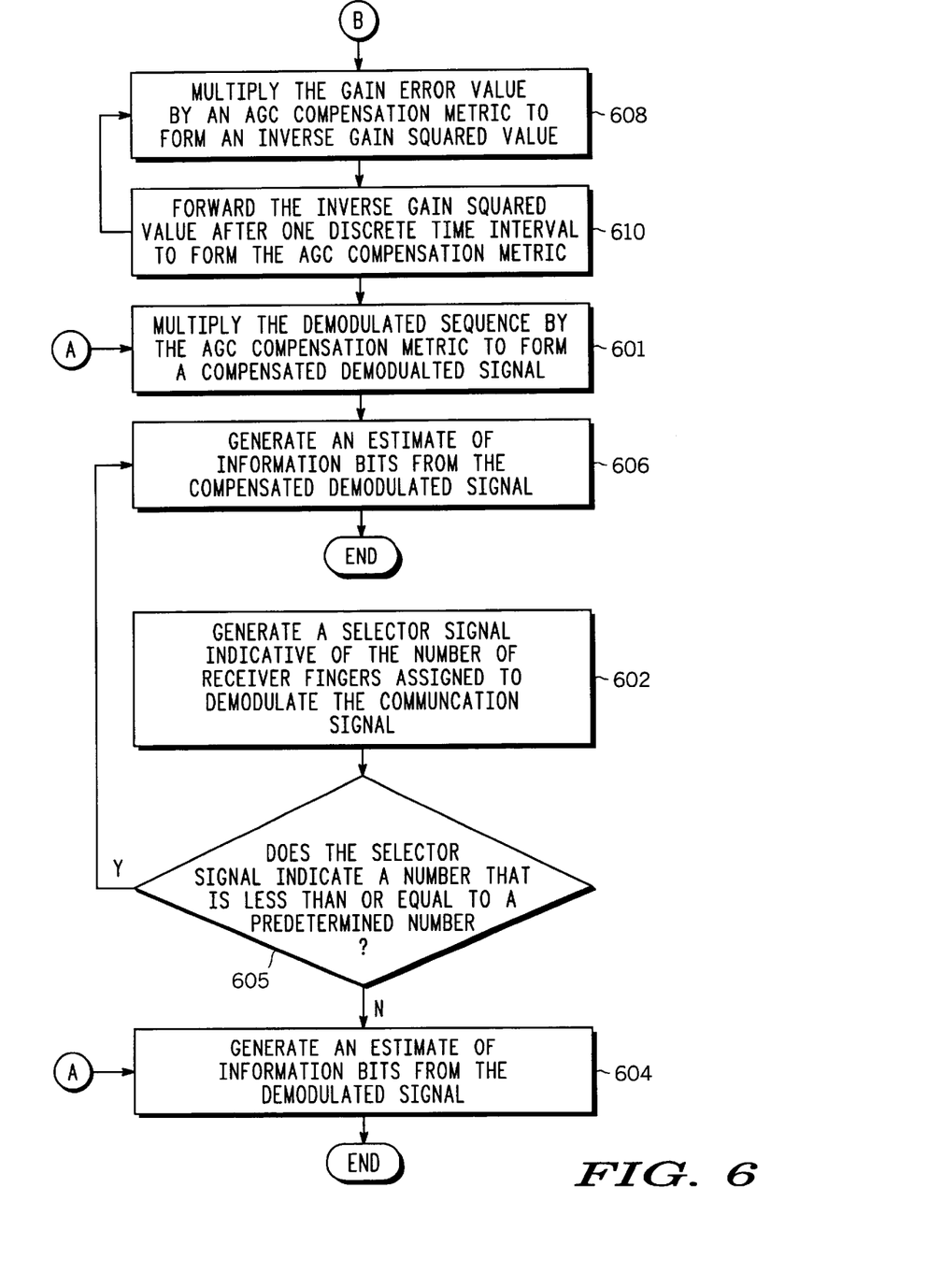

Referring to FIGS. 5 and 6, a method 500 for automatic gain control compensation in a mobile station receiver assembly in a wireless communication system begins at step 502 where the antenna 302 receives the coded signal R(t) 132. The coded signal R(t) 132 comprises a number of information-bearing frames, herein referred to as an information-bearing signal portion, and a non-information bearing signal portion(s), or interference, herein referred to as an interfering signal portion. Frequency down-converting of the coded signal R(t) 132 is performed by well-known methods by a down-converter 304. At step 504, the down-converted signal 303, output from the down-converter 304 and received by the fast AGC 306, enters the multiplier 308 where it is multiplied with an AGC gain value $g_n$ 305 to yield a post-AGC signal R'(t) 307. The AGC gain value $g_n$ 305 represents an AGC gain adjustment by the gain controller 312 at a discrete time t. Thus, the post-AGC signal R'(t) 307 is the product of the coded signal R(t) 132 and the AGC gain value $g_n$ 305.

Referring to the fast AGC 306 of FIG. 3, the power measurement device 310 receives the post-AGC signal R'(t) 307 and determines an ADC input variance $\sigma_{n-1}^2$ 323 at step 506. Thus, the power measurement device 310 is analogous to a sensor, yielding the ADC input variance $\sigma_{n-1}^2$ 323 based on a previous gain controlled signal at a discrete time n−1 formed by applying a previous gain adjustment $g_{n-1}$ at a discrete time n−1 to the coded signal R(t) 132.

Next, at step 508, the ADC input variance $\sigma_{n-1}^2$ 323 enters the gain error generator 342 where it is compared to an ADC input target variance $\Sigma^2$ to form a gain error value 341 which may be represented as $$\frac{\sigma_{n-1}^2}{\Sigma^2}.$$

The ADC input target variance $\Sigma^2$ 321 is a pre-selected value that is based on the type of ADC circuit used in the receiver assembly 300. The gain error value 341 represents a deviation of the power level of R'(t) from the pre-selected power value proscribed by the ADC input target variance $\Sigma^2$ 321.

At step 510, the gain error value 341 is multiplied by a previous AGC gain value inverse squared $$\frac{1}{g_{n-1}^2}$$

309 in the gain controller multiplier 311 to produce an updated AGC gain value inverse squared $$\frac{1}{g_n^2}$$

315. The previous AGC gain value inverse squared $$\frac{1}{g_{n-1}^2}$$

309 represents a gain value squared, previously determined by the gain controller 312 at a discrete time n−1 and output from the register 314 at a discrete time n.

Thus, the AGC gain value inverse squared $$\frac{1}{g_n^2}$$

315 calculated by the gain controller multiplier 311 at a discrete time n may be expressed as:

$$\frac{1}{g_n^2} = \frac{1}{g_{n-1}^2}\left(\frac{\sigma_{n-1}^2}{\overset{2}{\Sigma}}\right)$$

At a discrete time where n=1, $$\frac{1}{g_1^2} = \frac{1}{(g_0^2)}\left(\frac{\sigma_0^2}{\overset{2}{\Sigma}}\right)$$

At a discrete time where n=2, $$\frac{1}{g_2^2} = \frac{1}{(g_1^2)}\left(\frac{\sigma_1^2}{\overset{2}{\Sigma}}\right).$$

The inverse square root generator 316 then performs an inverse square root operation on the AGC gain value inverse squared $$\frac{1}{g_n^2}$$

315 to yield the AGC gain value 305, at step 512. The inverse square root operation is often implemented in a look-up table. The AGC gain value 305 may be expressed as $$g_n = g_{n-1}\left(\frac{\overset{}{\Sigma}}{\sigma_{n-1}}\right).$$

If the serving BTS has not completed transmission of the coded signal R(t), at step 515, the AGC gain value 305 is forwarded to the multiplier where it is multiplied by the coded signal R(t) at a next discrete time n+1.

As discussed above, the post-AGC signal R'(t) 307 represents an adjustment to the down-converted signal 303 such that the post-AGC signal R'(t) 307 falls within an optimum target variance suitable for input to the ADC 316. Conversion of the post-AGC signal R'(t) 307 into a digital signal stream 325 is performed by well known methods by the ADC 316, at step 514. Next, at step 516 the demodulator 318 removes the spreading code P(t) previously inserted into the series of Walsh symbols by the transmitting BTS. As is known, the demodulator 318 also generates a series of SIR sequence values, or a demodulated sequence 327, that are a series of integer values representative of a soft estimate of the likelihood of the presence of a "1" or "0" code symbol. The soft decoder 220, which may include a deinterleaver and a convolutional decoder (not shown), then utilizes the demodulated sequence 327 to generate an estimate of information bits, 1 or 0, representative of the information used to code the information signal portion.

Operation of the automatic gain control compensator 340 in the receiver assembly 300 substantially negates the gain adjustment to the coded signal R(t) 132 caused by operation of the fast AGC 306 in those case where the finger manager 319 has assigned only one receiver finger (L=1) to demodulate the coded signal R(t) 132. Stated generally, the automatic gain control compensator 340 compensates for the power variations introduced into the constant interfering portion of coded signal R(t) 132, expressed as a variable power post-AGC interfering signal portion, as a result fast AGC 306 operation.

Referring to FIG. 6, at step 601, the first compensator multiplier 348 multiplies the AGC compensation metric 343, with the demodulated sequence 327, output from the demodulator 318 to form a resulting compensated demodulated sequence 347, or a compensated sequence of SIR values. Accordingly, the resulting compensated demodulated sequence 347 is substantially equivalent to a demodulated sequence output from the demodulator 318 that was not subjected to a gain adjustment by the fast AGC 306.

Mathematically, the compensated demodulated sequence 347 can be described by noting that the AGC compensation metric 343

$$\frac{1}{g_{n-1}^2}$$

is equivalent to the inverse of the AGC gain value $g_n^2$ 305, squared. Thus, when applied to the demodulated sequence 327, the AGC compensation metric 343

$$\frac{1}{g_{n-1}^2}$$

removes the gain adjustment associated with the operation of the AGC 306.

As previously discussed in connection with FIG. 2, in the case of the coded signal R(t) 132 having a dominant time-varying information-bearing signal portion and a constant interfering signal portion, and only one finger assigned to demodulate the coded signal R(t) 132, operation of the AGC 306 causes undesirable fluctuations in the post-AGC interfering signal power level. As a result of the undesirable fluctuations in the post-AGC interfering signal power level, the demodulator must perform the computationally prohibitive step of dividing an estimated information-bearing signal power level for each received symbol by an estimated interfering signal power level for each received symbol to obtain the SIR of the sequence of received symbols of the information-bearing signal required by the decoder. As is shown in equation (2) derived in connection with FIG. 2, this is not a severe problem in the case where multiple receiver fingers have been assigned to demodulate the coded signal R(t) 132. As is shown in equation (1) derived in connection with FIG. 2, it is however, a problem in the case where only one receiver finger has been assigned to demodulate the coded signal R(t) 132. As was also discussed in connection with FIG. 2, operation of the finger manager in the searcher of the receiver assembly 200 causes the assignment of one or more RAKE receiver fingers to demodulate the received signal R(t) 132.

Returning to FIG. 3, operation of the finger manager 319 in the receiver assembly 300 results in the assignment of one or more RAKE receiver fingers to demodulate the received signal R(t) 132. As previously discussed, same-cell interference $i_{sc}(t)$ results primarily from receiver finger demodulation by multiple receiver fingers within the receiver. For example, in the case where three receiver fingers, 1, 2, and 3, are assigned to demodulate coded signal R(t), noise resulting from demodulation by receiver fingers 2 and 3 causes same-cell interference $i_{sc}(t)$ to receiver finger 1. Similarly, demodulation by receiver fingers 1 and 3 causes same-cell interference $i_{sc}(t)$ to receiver finger 2. Thus, same-cell interference $i_{sc}(t)$ is minimum when only one receiver finger is assigned to demodulate coded communication signal R(t).

Returning to FIG. 6, at step 602, the finger controller 352, responsive to the finger manager 319, generates a selector signal 351 which causes the selector 350 to select as input, either the compensated demodulated sequence 347, resulting from operation of the first compensator multiplier 348, or the demodulated sequence 327 output from the demodulator 318. The selection of either the compensated demodulated sequence 347, or the demodulated sequence 327, is based on the number of receiver fingers assigned by the finger manager 319 to demodulate the coded signal R(t) 132. If the number of receiver fingers assigned to demodulate the coded signal R(t) 132 is not less than or equal to predetermined number, the selector signal 351 cause the selector 350 at step 604 to select the demodulated sequence 327 to be forwarded to the soft decoder 330 where an estimate of a series of information bits "1" or "0", will be generated as discussed above. If the number of receiver fingers assigned to demodulate the coded signal R(t) 132 is less than or equal to the predetermined number of receiver fingers, the selector signal 351 cause the selector 350 at step 606 to select the compensated demodulated sequence 347 to be forwarded to the soft decoder 330 where an estimate of a series of information bits "1" or "0", will be generated. For example, if the predetermined number is one, the selector signal 351 cause the selector 350 at step 606 to select the compensated demodulated sequence 347 if one receiver finger is assigned to demodulate the coded signal R(t) 132. Thus, based on the operation of the selector 350, the soft decoder 330 further demodulates either the compensated demodulated sequence 347 or demodulated sequence 327, to produce an estimate of information-bearing signal S(t) transmitted from the serving BTS.

At step 608, the second compensator multiplier 344 multiplies the gain error value 341, received from the gain error generator 342 of the fast AGC 306, with a register value, output from compensator register 346, to yield an inverse gain squared value 345. The inverse gain squared value 345 may be expressed as $$\frac{1}{g_n^2}$$

at a discrete time n while the register value at a discrete time n-1 represents the inverse gain squared value at a discrete time n-1. Accordingly, at step 610, the compensator register 346 operates in discrete time increments so that the inverse gain squared value 345 is input to the compensator register 346 at a discrete time n, and is output as an AGC compensation metric 343 at the next discrete time. The AGC compensation metric 343 at a discrete time n-1 may be represented as $$\frac{1}{g_{n-1}^2}.$$

The operation of the second compensator multiplier 344 in conjunction with the compensator register 346 is described in Table 1.

TABLE 1

| Discrete Time n | AGC Compensation Metric 343 | Gain Error Value 341 | Inverse Gain Value Input 345 |
|---|---|---|---|
| 1 | $\frac{1}{g_0^2} = 1$ | $\frac{\sigma_0^2}{\Sigma^2}$ | $\frac{1}{g_1^2} = \frac{\sigma_0^2}{\Sigma^2} = \left(\frac{1}{g_0^2}\right)\left(\frac{\sigma_0^2}{\Sigma^2}\right)$ |
| 2 | $\frac{1}{g_1^2} = \frac{\sigma_0^2}{\Sigma^2}$ | $\frac{\sigma_1^2}{\Sigma^2}$ | $\frac{1}{g_2^2} = \frac{\sigma_0^2 \sigma_1^2}{\Sigma^4} = \left(\frac{1}{g_1^2}\right)\left(\frac{\sigma_1^2}{\Sigma^2}\right)$ |
| 3 | $\frac{1}{g_2^2} = \frac{\sigma_0^2 \sigma_1^2}{\Sigma^4}$ | $\frac{\sigma_2^2}{\Sigma^2}$ | $\frac{1}{g_3^2} = \frac{\sigma_0^2 \sigma_1^2 \sigma_2^2}{\Sigma^6} = \left(\frac{1}{g_2^2}\right)\left(\frac{\sigma_2^2}{\Sigma^2}\right)$ |

In this way, operation of the automatic gain control compensator 340 negates the operation of the fast AGC 306 only in the case where one finger is assigned to demodulate the coded signal R(t) 132 having a dominant time-varying information-bearing signal portion and a constant interfering signal portion.

Figure 4:
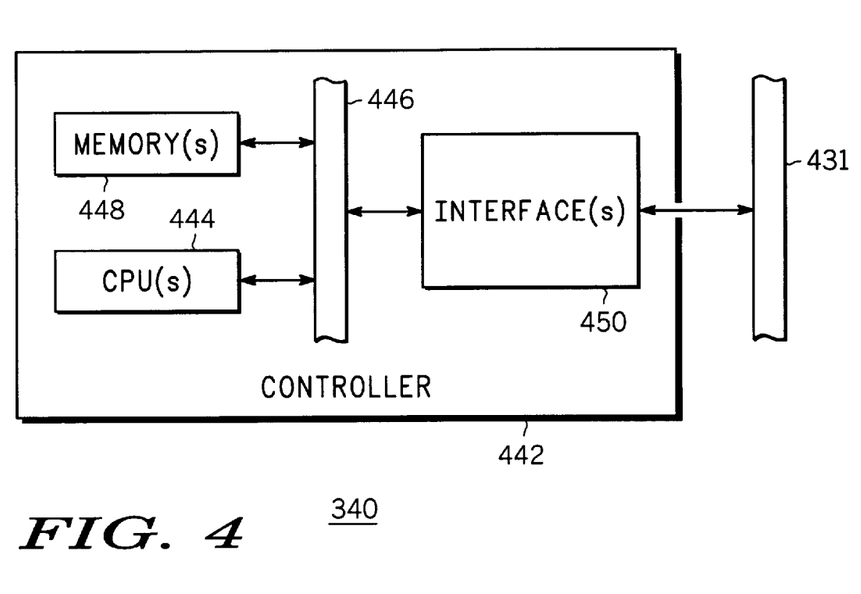
FIG. 4 is a more detailed block diagram showing another embodiment of an automatic gain control compensator.

A more detailed block diagram of another embodiment of automatic gain control compensator 340 is illustrated in FIG. 4. The automatic gain control compensator 340 may be a personal computer (PC), a personal digital assistant (PDA), an Internet appliance, or any other device capable of providing compensation due to the operation AGC circuit in a receiver assembly such as the receiver assembly 300. The automatic gain control compensator 340 includes a controller 442, which preferably includes a central processing unit (CPU) 444 electrically coupled by address/data bus 446 to a memory device 448 and an interface circuit 450. The CPU 444 may be any type of well-known CPU, such as an Intel Pentium™ processor, or a Motorola PowerPC. The memory device 448 preferably includes volatile and non-volatile memory. Preferably, the memory device 448 stores a software algorithm that interacts with the receiver assembly 300 as described below. The memory device 448 may also store digital data indicative of inputs from the receiver assembly 300, for example the demodulated sequence 327 and the gain error value 341.

The interface circuit 450 may be implemented using any type of well-known interface standard such as an Ethernet interface and/or a Universal Serial Bus (USB) interface. The automatic gain control compensator 340 may also exchange data with other devices via any type of a network connection 431 to the receiver assembly 300. The network connection 431 may be any type of network connection such as one or more twisted pairs of copper wire, an Ethernet connection, a digital subscriber line (DSL, a coaxial cable, a fiber optic cable, etc.

In summary, persons of ordinary skill in the art will readily appreciate that a method and apparatus for automatic gain control compensation in a wireless communication system has been provided. Users of systems implementing the teachings described herein can enjoy improved mobile station RAKE receiver operation by substantially negating the effects of operation of RAKE receiver AGC operation in those cases where the mobile station has received a signal from a serving BTS having a dominant time-varying information signal portion and a constant interfering signal portion, and a finger manager in the mobile station RAKE receiver has assigned only one RAKE receiver finger to demodulate the signal.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description, but rather by the claims appended hereto.

What is claimed:

1. In a wireless communication system, the wireless communication system including at least one base transceiver station and at least one mobile station having a receiver assembly, the base transceiver station capable of transmitting a coded signal having an information-bearing signal portion, the mobile station capable of receiving the coded signal having the information-bearing signal portion and an associated interfering signal portion, the receiver assembly including an automatic gain control circuit for adjusting a gain of the coded signal and a receiver having a number of receiver fingers for demodulating the coded signal and a finger manager for assigning the receiver fingers to demodulate the coded signal, an apparatus for automatic gain control compensation in the receiver assembly of the mobile station, the apparatus comprising:

(a) an automatic gain control circuit configured to cause a gain adjustment to the coded signal by multiplying the coded signal by an AGC gain value to produce a post-AGC signal and an associated gain error value, the post-AGC signal having a post-AGC interfering signal portion with an associated post-AGC interfering signal power level; and (b) an automatic gain control compensator configured to compensate for the gain adjustment to the coded signal if the number of receiver fingers assigned to demodulate the coded signal is less than or equal to a predetermined number.

2. The apparatus for automatic gain control compensation according to claim 1, wherein the automatic gain control compensator comprises:

a first compensator multiplier configured to multiply the post-AGC signal by an AGC compensation metric to form a compensated post-AGC signal;

a finger controller configured to generate a selector signal based on the number of receiver fingers assigned to demodulate the coded signal; and a selector for selecting the compensated post-AGC signal to be forwarded to a decoder of the receiver if the selector signal indicates that the number of receiver fingers assigned to demodulate the coded signal is less than or equal to the predetermined number or selecting the post-AGC signal to be forwarded to the decoder if the selector signal indicates that the number of receiver fingers assigned to demodulate the coded signal is not less than or equal to the predetermined number.

3. The apparatus for automatic gain control compensation according to claim 2, wherein the automatic gain control compensator further comprises:

a second compensator multiplier configured to multiply the AGC compensation metric with the gain error value to form an inverse gain squared value;

a compensator register configured to forward the inverse gain squared value after a discrete time interval has elapsed to yield the AGC compensation metric, wherein the AGC compensation metric is substantially equally to an inverse of the AGC gain value squared; and wherein the AGC compensation metric at a discrete time n is equivalent to the inverse gain squared value at a discrete time n−1.

4. The apparatus for automatic gain control compensation according to claim 2, further comprising:

an analog to digital converter configured to convert the post-AGC signal to a digital stream, wherein the digital stream represents the post-AGC interfering signal and a post-AGC information signal;

a demodulator configured to generate a demodulated sequence from the digital stream;

a decoder configured to convert the demodulated sequence to an estimate of information bits representative of information used to encode the coded signal; and wherein the first compensator multiplier is configured to multiply the demodulated sequence by the AGC compensation metric to form the compensated post-AGC signal.

5. The apparatus for automatic gain control compensation according to claim 4, wherein the demodulated sequence is a sequence of SIR values representative of a series of power ratios of the information-bearing signal portion to the interfering signal portion of the coded signal.

6. The apparatus for automatic gain control compensation according to claim 1, wherein the post-AGC interfering signal power level is a varying post-AGC interfering signal power level.

7. The apparatus for automatic gain control compensation according to claim 1, wherein the predetermined number is one.

8. The apparatus for automatic gain control compensation according to claim 1, wherein automatic gain control circuit comprises a gain error generator configured to calculate the gain error value from a comparison between an analog-to-digital converter input variance and an analog-to-digital converter input target variance, and wherein the analog-to-digital converter input target variance is pre-selected based on an analog-to-digital converter utilized in the receiver assembly, and wherein the analog-to-digital converter input variance value is based on the post-AGC signal at a discrete time n−1.

9. In a wireless communication system, the wireless communication system including at least one base transceiver station and at least one mobile station having a receiver assembly, the base transceiver station capable of transmitting a coded signal having an information-bearing signal portion, the mobile station capable of receiving the coded signal having the information-bearing signal portion and an associated interfering signal portion, the receiver assembly including an automatic gain control circuit for adjusting a gain of the coded signal and a receiver having a number of receiver fingers for demodulating the coded signal and a finger manager for assigning the receiver fingers to demodulate the coded signal, method for automatic gain control compensation in the receiver assembly of the mobile station, the method comprising:

(a) causing a gain adjustment to the coded signal by multiplying the coded signal by an AGC gain value to produce a post-AGC signal and an associated gain error value, the post-AGC signal having a post-AGC interfering signal portion with an associated post-AGC interfering signal power level; and (b) compensating for the gain adjustment to the coded signal if the number of receiver fingers assigned to demodulate the coded signal is less than or equal to a predetermined number.

10. The method for automatic gain control compensation according to claim 9, wherein the step of compensating for the gain adjustment comprises the steps of:

multiplying the post-AGC signal by an AGC compensation metric to form a compensated post-AGC signal;

generating a selector signal based on the number of receiver fingers assigned by the finger manager to demodulate the coded signal; and selecting the compensated post-AGC signal to be forwarded to a decoder of the receiver assembly if the selector signal indicates that the number of receiver fingers assigned to demodulate the coded signal is less than or equal to the predetermined number or selecting the post-AGC signal to be forwarded to the decoder if the selector signal indicates that the number of receiver fingers assigned to demodulate the coded signal is not less than or equal to the predetermined number.

11. The method for automatic gain control compensation according to claim 9, wherein the step of compensating for the gain adjustment further comprises the steps of:

multiplying the AGC compensation metric with the gain error value to form an inverse gain squared value; and generating the AGC compensation metric from the inverse gain squared value after a discrete time interval has elapsed, wherein the AGC compensation metric is substantially equal to an inverse of the AGC gain value squared, and wherein the AGC compensation metric at a discrete time n is equivalent to the inverse gain squared value at a discrete time n−1.

12. The method for automatic gain control compensation according to claim 9, further comprising the steps of:

converting the post-AGC signal into a digital stream, wherein the digital stream represents the post-AGC interfering signal and a post-AGC information signal;

generating a demodulated sequence from the digital stream;

converting the demodulated sequence to an estimate of information bits representative of information used to encode the coded signal; and wherein the compensated post-AGC signal is formed by multiplying the demodulated sequence by the AGC compensation metric.

13. The method for automatic gain control compensation according to claim 12, wherein the demodulated sequence is a sequence of SIR values representative of a series of power ratios of the information-bearing signal portion to the interfering signal portion of the coded signal, and wherein the compensated post-AGC signal is a compensated demodulated signal.

14. The method for automatic gain control compensation according to claim 9, wherein the post-AGC interfering signal power level is a varying post-AGC interfering signal power level.

15. The method for automatic gain control compensation according to claim 9, wherein the predetermined number is one.

16. The method for automatic gain control compensation according to claim 15, wherein the step of multiplying the post-AGC signal by an AGC compensation metric comprises the steps of:

multiplying the AGC compensation metric with the gain error value to form an inverse gain squared value; and generating the AGC compensation metric from the inverse gain squared value after a discrete time interval has elapsed, wherein the AGC compensation metric is substantially equal to an inverse of the AGC gain value squared, and wherein the AGC compensation metric at a discrete time n is equivalent to the inverse gain squared value at a discrete time n−1.

17. The method for automatic gain control compensation according to claim 9, wherein the step of causing the gain adjustment comprises the steps of:

determining an ADC input variance based on a previous post-AGC signal at a discrete time n−1, wherein the ADC input variance value is representative of a previous AGC gain value applied to the coded signal at the discrete time n−1;

calculating the gain error value based on a comparison of the ADC input variance to an ADC input target variance, wherein the ADC input target variance is pre-selected based on the type of ADC used in the mobile station receiver assembly;

multiplying the gain error value with a previous AGC gain value inverse squared to form an AGC gain value inverse squared, wherein a previous gain adjustment to the coded signal at the discrete time n−1 was caused by multiplying the previous AGC gain value with the coded signal;

calculating an inverse square root of the AGC gain value inverse squared to form the AGC gain value; and multiplying the AGC gain value with the coded signal to cause the gain adjustment.

18. In a code division multiple access wireless communication system, the wireless communication system including at least one base transceiver station and at least one mobile station having a receiver assembly, the mobile station capable of receiving a coded signal from the base transceiver station, the receiver assembly including an automatic gain control circuit for adjusting a gain of the coded signal to produce a gain error value and a post-AGC signal formed by multiplying the coded signal by an AGC gain value, the post-AGC signal having a post-AGC interfering signal portion with an associated variable post-AGC interfering signal power level, the receiver assembly further including a receiver having a number of receiver fingers for demodulating the coded signal and a finger manager for assigning the receiver fingers to demodulate the coded signal, a method for automatic gain control compensation in the receiver assembly of the mobile station, the method comprising:

(a) multiplying the post-AGC signal by an AGC compensation metric to form a compensated post-AGC signal; and (b) selecting the compensated post-AGC signal to be forwarded to a decoder of the receiver assembly if the number of receiver fingers assigned to demodulate the coded signal is less than or equal to a predetermined number or selecting the post-AGC signal to be forwarded to the decoder if the number of receiver fingers assigned to demodulate the coded signal is not less than or equal to the predetermined number.

19. The method for automatic gain control compensation according to claim 18, wherein the predetermined number is one.

* * * * *